(12) United States Patent
Wiker et al.

(10) Patent No.: US 6,443,257 B1
(45) Date of Patent: Sep. 3, 2002

(54) ACOUSTICAL PANEL HAVING A CALENDERED, FLAME-RETARDANT PAPER BACKING AND METHOD OF MAKING THE SAME

(75) Inventors: Anthony L. Wiker, Lancaster, PA (US); Laurel Kulas, Columbus, OH (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 09/645,205

(22) Filed: Aug. 25, 2000

Related U.S. Application Data
(60) Provisional application No. 60/151,005, filed on Aug. 27, 1999.

(51) Int. Cl.[7] .............................................. G10K 11/04
(52) U.S. Cl. ..................... 181/290; 181/286; 181/294; 181/295
(58) Field of Search ................................. 181/284, 286, 181/287, 290, 291, 292, 293, 294, 295

(56) References Cited

U.S. PATENT DOCUMENTS

| | | | |
|---|---|---|---|
| 3,183,996 A | 5/1965 | Capaul | |
| 3,616,144 A | 10/1971 | Kenney | |
| 4,010,817 A | 3/1977 | Warren et al. | |
| 4,016,234 A | 4/1977 | Warren et al. | |
| 4,040,213 A | * 8/1977 | Capaul | 181/290 |
| 4,056,161 A | * 11/1977 | Allen, Jr. | 181/290 |
| 4,428,454 A | 1/1984 | Capaul et al. | |
| 4,627,199 A | 12/1986 | Capaul | |
| 5,753,871 A | 5/1998 | Kahara et al. | |

* cited by examiner

Primary Examiner—Khanh Dang
(74) Attorney, Agent, or Firm—Womble Carlyle Sandridge & Rice, PLLC

(57) ABSTRACT

Disclosed is a multi-layered, substantially rigid and self-supporting acoustical panel. Preferably, the panel includes an acoustically absorbent semi-rigid core having a substantially continuous interior porosity. The panel also includes an acoustically permeable face layer applied to a first face of the core, wherein the face layer is adapted to allow acoustical energy to pass through the face layer and into the acoustically absorbent core. The panel also includes a flame-retardant, calendered paper backing adapted to be applied to the core. According to the present invention, the panel may also include a flame-retardant adhesive adapted to attach the calendered, flame-retardant paper backing to the core.

24 Claims, 1 Drawing Sheet

ACOUSTICAL PANEL HAVING A CALENDERED, FLAME-RETARDANT PAPER BACKING AND METHOD OF MAKING THE SAME

This application claims the benefit of U.S. Provisional Application Ser. No. 60/151,005, filed on Aug. 27, 1999.

FIELD OF THE INVENTION

The present invention relates to building materials, and more particularly it relates to acoustical panels having fire retardant properties for use in ceiling and wall structures.

BACKGROUND OF THE INVENTION

Acoustical ceiling or wall panels generally include an acoustically absorbent inner core, a backing material for enhancing panel strength, and front facing for enhancing the aesthetic appearance of the panel.

Typically, the inner core may comprise fiberglass bats formed from resin impregnated fiberglass. Other inner core materials may comprise wet-laid mineral, slag mineral, or cellulosic fibers. Rock, slag mineral and cellulosic fibers may also utilize a variety of inorganic fillers such as perlite, clays and gypsum. Panels designed for high acoustical absorption necessarily contain highly porous cores achieved by using low-density bats or cores. These cores, by themselves, lack the necessary characteristics to finction as ceiling or wall panels.

Additionally, gravity may cause the inner core to deform. When starch is used as a binder for slag mineral fibers, high humidity may also weaken the panel strength. Those structural deficiencies may require the use of a backing material attached to one side of the core.

In addition to poor structural integrity, the inner cores of acoustical panels often lack sufficient light reflecting and uniformity in shade or color to render their natural appearance aesthetically pleasing. For that reason, the inner core usually requires a decorative facing applied to the opposite side of the core that receives the backing material.

Although known inner cores are acoustically permeable and can absorb acoustical energy, some acoustical energy will inevitably be transmitted through the core and into adjacent spaces, unless the core includes a sufficient thickness and surface area to dissipate the sound as heat energy. Since sufficient surface area to completely dissipate the acoustic energy is often difficult to achieve in an economically feasible fashion, most manufacturers employ a barrier comprised of a thin layer of aluminum foil. The aluminum foil is impermeable to air and highly dense with respect to other materials within the panel and, therefore, increases the overall sound absorption. The aluminum foil is also incombustible, which makes the foil desirable for a Class A rating in building material applications.

For example, U.S. Pat. No. 3,183,996 to Capaul discloses an acoustical structural panel which includes an inner metal slag core having a paper facing with a coating of aluminum flake for the purpose of heat reflection. Similarly, U.S. Pat. No. 4,627,199 to Capaul discloses a tackable acoustical structure comprising a tack pin retaining layer, a sound absorptive layer and a metal foil septum separating the tack pin retaining layer and the sound absorptive layer to enhance the sound absorbent and flame-retardant properties of the structure. Additionally, U.S. Pat. No. 4,428,545 to Capaul utilizes a metallic backing which imparts enhanced sound transmission and insulation properties to a finished acoustical panel construction.

The use of a metallic foil as a backing within acoustical panels presents several problems. The first problem relates to impurities left on a finished panel product as a result of the production process. More specifically, the production process requires the use of oil in the converting process of aluminum foil prior to installation on the acoustical panel. As a result, the oil creates a black residue on the acoustical panel, which makes handling the panel quite difficult upon installation into a grid within a dropped ceiling pre-assembly. If not carefully installed, the black residue may mar the highly light reflective white face surface of the acoustical panel with smudges and stains.

Another problem associated with the use of a thin aluminum film as a backing material is the tendency of the aluminum foil to buckle and tear. Since the relative cost of aluminum is high with respect to other materials within a typical acoustical panel, it is necessary to apply only a thin foil having a thickness, for example, of approximately 0.0015 inches. The foil may buckle or tear during the application of the foil to the core and trimming of the foil from the panel during the panel manufacturing process. Furthermore, the foil is liable to tear or become perforated during remaining production steps and even during installation by the customer. A third issue arises from the increased utilization of devices that propagate or receive transmission signals such as radios, cellular telephones and infrared control devices for lighting and heating. Aluminum and other metallic foils tend to block or interfere with signals in the electromagnetic spectrum. Thus, ceilings having panels with aluminum foil backing present a broad metal surface in a room, over an entire floor, and often on every floor throughout an office building, which virtually renders all wireless communication devises useless.

Some have attempted to utilize paper backings within acoustical panels. For example, U.S. Pat. No. 4010,817 to Warren et al. forms the acoustical panel on top of the paper by screeding the panel material onto the paper and then drying the cast pre-assembly. U.S. Pat. No. 5,753,871 to Kahara uses a nearly identical process to form an inner core of mineral wool and starch binder gel to a paper backing within a molding tray to form an acoustical panel.

There are several problems associated with wet forming a material to a paper backing. First, Warren and Kahara must re-wet the paper backing when applying a latex finish facing to the acoustical panel to avoid warping of the panel. Additionally, the manufacturing methods of Kahara and Warren also require the additional step of removing the partially finished panel from the mold for final processing. Those steps add additional cost to the manufacturing process, thus making such methods undesirable.

With the foregoing problems associated with the prior art use of metallic foils and paper backings within acoustical panels in mind, it is a general object to create an acoustical panel with a paper backing having desirable acoustical sound absorption properties, while being simple and inexpensive to manufacture.

SUMMARY OF THE INVENTION

The present invention provides a multi-layered, substantially rigid and self-supporting acoustical panel. The panel comprises a core which has a first face with a second face that is disposed opposite the first face. There is applied to the first face an acoustically permeable facing layer. Additionally, a calendered paper backing adapted to be applied to the core is provided. The paper backing is substantially free of metallic material and includes a flame-retardant material.

Furthermore, a method of manufacturing a multi-layered, substantially rigid acoustical panel is provided. The method includes providing an acoustically absorbent core having a first face, and a second face disposed opposite the first face. A finishing layer is applied to the first face of the core, and a calendered, flame-retardant, and substantially metallic material free cellulosic sheet is adhered to the second face of the core.

In one embodiment, the core may comprise an acoustical fiberglass bat, which is bound into a semi-rigid state with a resin material. The core may also include slag mineral fiber, cellulosic fiber or polymeric fiber materials having a filler of clay, perlite, gypsum or any other material suitable for filling purposes. Additionally, any number of binders would be suitable for the aforementioned fillers, including starches or polymeric resins. In addition to the above-referenced materials, the acoustically absorbent core may comprise a cemetitious or polymeric foam having any number of filler materials. The core material may also comprise bound aggregate particles.

In a further embodiment, the face layer may comprise an air permeable scrim material adhered to the panel core with poly (vinyl acetate) glue. In other embodiments, the facing may include the scrim with a layer of paint applied thereto. Other embodiments of the present invention may include a face layer comprising a perforated polymeric film for allowing permeation of acoustical energy throughout the acoustically absorbent core. One example of many possible polymeric materials for use as a face layer on the panel may include a polyvinylchloride (PVC) film. Additionally, in another embodiment of the present invention, the PVC film may receive an air permeable layer of paint.

These and other features of the present invention will become apparent upon reading the following specification, when taken in conjunction with the accompanying drawings.

DETAILED DESCRIPTION OF THE INVENTION

Figure 1:
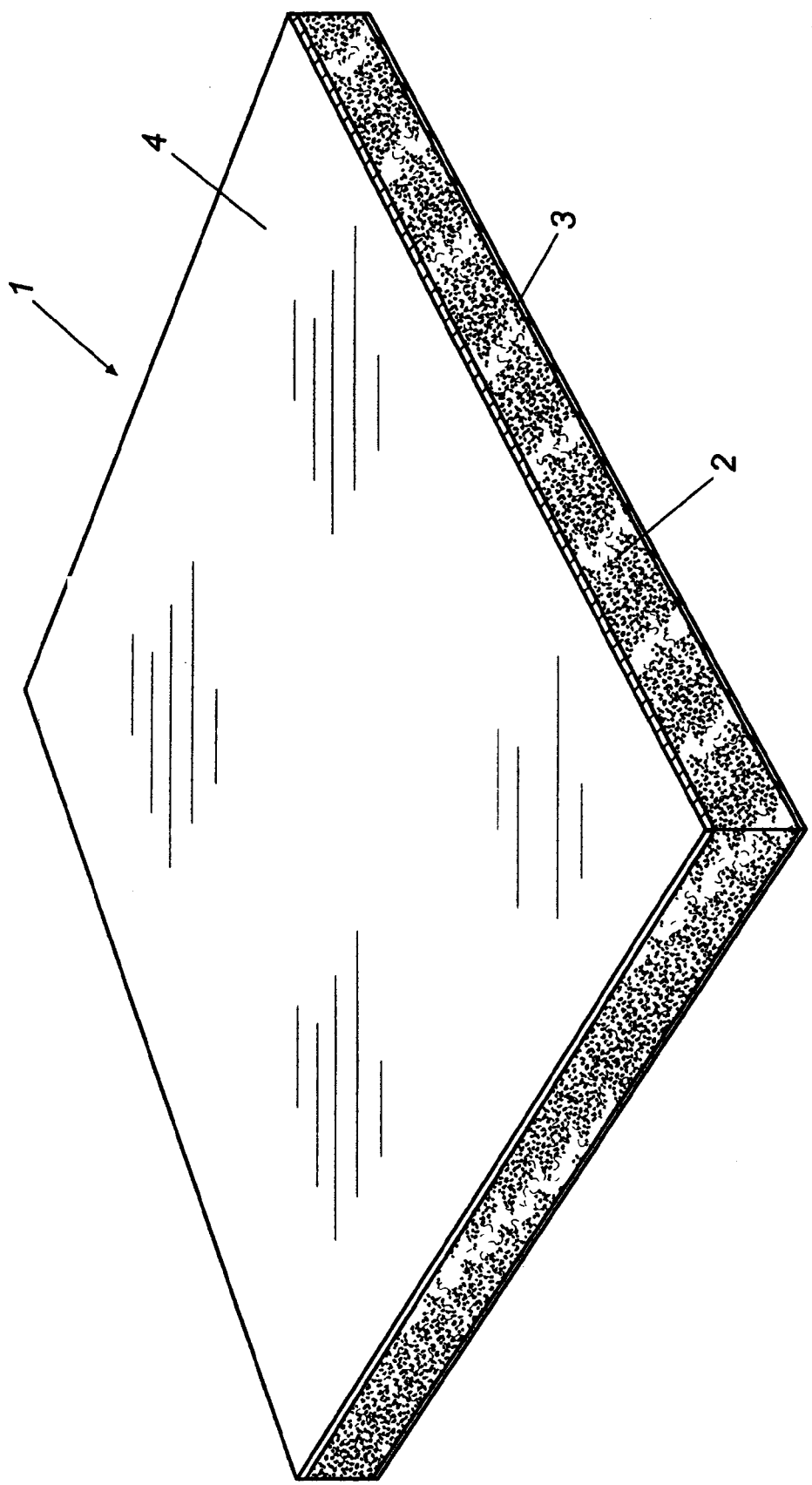
FIG. 1 is a sectional view of a ceiling panel according to the present invention.

The present invention essentially includes a multi-layered, substantially rigid and self-supporting acoustical panel. The panel comprises a core which has a first face with a second face that is disposed opposite the first face. To the first face there is applied an acoustically permeable facing layer. Additionally, a calendered paper backing adapted to be applied to the core is provided. The paper backing is substantially free of metallic material and includes a flame-retardant material.

In greater detail, FIG. 1 illustrates an acoustical ceiling panel 1 including essentially a three layered, self-supporting, laminated structure in which a core 2 is a porous bat or panel composed of fibers and/or fillers held together with a binder. Core 2 may comprise any type of fibers, including, but not limited to, fiberglass, cellulosic (natural), metallic slag or polymeric. Core 2 may also comprise a cementitious or polymeric foam reinforced with the above-referenced fibers, or may comprise bound aggregate particles. The core may also include fillers such as, but not limited to, cellulosic perlite or clay materials. In a preferred embodiment, however, the core may comprise a prefabricated, low density, 2–10 lb./ft$^3$ fiberglass bat, typically bound with a phenolic resin. In another embodiment, the panel may comprise a rock or slag mineral fiber panel typically bound with starch or latex. Mineral fiber, starch-bound panels are typically more dense, having a density of 8–20 lb/ft$^3$. In accordance with the present invention, the core 2 may comprise virtually any material combination as long as enough continuous porosity is present to achieve the acoustic absorbency as set forth below.

An acoustically permeable face layer 3 is applied to the one side of the bat core or panel, which may be a lightly painted scrim, a woven or non-woven fabric, a perforated polymeric film, a perforated membrane, or a discontinuous paint coat which allows for the permeation of acoustic energy into the absorbent core 2. If the face layer 3 comprises a film or membrane, a flame-retardant adhesive may attach the face layer 3 to the core 2.

Finally, a calendered, flame-retardant paper 4 is applied to the back of the surface of the core with a flame-retardant adhesive and acts as a barrier to sound transmission through the structure.

According to the present invention, the structure has been reduced to practice and well tested, as set forth below in Example 1. The paper backing provides sufficient air-flow resistance to render to the panel a CAC value equal to that of the same structure backed with a 0.0015 in. thick aluminum foil.

EXAMPLE 1

Example 1 utilized as a face layer 3 an Owens-Corning fiberglass scrim having an unpainted air permeability of 150 ft$^3$/ft$^2$/min. The scrim received a layer of Armstrong Durabrite latex paint equal to approximately 36 g/m$^2$. In order to adhere the scrim to the core 2, the inventors utilized a flame-retardant poly (vinyl acetate) glue. The glue composition comprised a brominated aromatic oxide and a metallic flame-retardant material at approximately 25% by weight within the glue. Other flame-retardant materials suitable for use with the poly (vinyl acetate) glue may include other halogenated fire suppressants, hydrated inorganic compounds such as aluminum trihydrate, magnesium hydroxide, calcium borate, and zinc borate, intumescent phosphate compounds such as ammonium polyphosphate, organic and inorganic phosphate compounds such as ammonium sulfate, other sulfate and sulfamate compounds, and free radical scavenger materials such as antimony trioxide. Other suitable adhesives may include, but are not limited to, polyvinyl alcohol, starch, and waterborne lattices such as acrylic, styrene-acrylate or ethylene vinyl chloride dispersions. Non-waterborne polymeric systems, such as acrylates and methacrylates, may also be suitable for use as adhesives.

The core 2 comprised a 1-in. thick phenolic-bound fiberglass batting having a density of approximately 5.0 lb/ft$^3$.

The paper backing 4 comprised a calendered paper having a thickness of 0.0029 in., a basis weight of 50 lb./3000 ft$^2$, a flame-retardant system comprised of ammonium sulfate and inorganic salts, and was manufactured by Pepperell, Inc., of Pepperell, Mass. 01463.

The basis weight paper is an expression of mass of paper per unit area. Calendering does not change basis weight. Calendering changes the paper density by decreasing and compressing the paper thickness. For example, calendering of the paper moves the paper density from approximately twelve (12) pounds per point of thickness to approximately fifteen (15) pounds per point of thickness. Thus, the calendered paper used in Example 1 had a density of approximately 68.9 lbs per ft.$^3$, whereas the density of an uncalendered paper having the same basis weight would be approximately 53.4 lbs per ft.$^3$ The porosity of the uncalendered paper having the same basis weight is approximately three (3) times greater. The paper manufacturer utilized the TAPPI T460om-83 and T536cm-85 test protocols to test the porosity of the calendered paper in Example 1. The TAPPI T460om-83 and T536cm-85 tests yield a value of approximately one hundred ten (110) seconds for one hundred (100) cubic centimeters (cc) of air to pass through the calendered paper at the standard test pressure drop under testing conditions and parameters called out in the above-referenced TAPPI test protocols. As a basis of comparison, uncalendered paper having the same composition and basis weight as paper used in Example 1 has a porosity test value of approximately thirty six (36) seconds.

The flame-retardant system material of ammonium sulfate and inorganic salts comprised 11–13% by mass of the paper utilized in Example 1. Other suitable flame retardant materials for use in the calendered paper may include, but are not limited to, hydrated materials such as aluminum trihydrate and calcium borate, intumescent (char formers) such as diammonium phosphate and urea-phosphate, and vapor phase free radical scavengers such as antimony trioxide. Sulfate or sulfamate compounds, such as ammonium sulfate also flame retard cellulosics.

Table 1 illustrates CAC test results for the sample made in Example 1. The results of Table 1 indicate the measure of sound transmission loss obtained for three different lots of this paper backed composite. Essentially, in this test, sound was transmitted into the face side of the composite panel over a range of frequencies and the decibel reduction at each frequency was measured on the other side of the panel. Results of tests on two lots of foil backed composites having a standard 0.0015" thick aluminum foil are given for comparison. Equivalent performance is evident.

TABLE 2

NRC Test

| Frequency (Hz) | Absorption Coefficient |
|---|---|
| 100 | 0.44 |
| 125 | 0.42 |
| 160 | 0.45 |
| 200 | 0.45 |
| 250 | 0.53 |
| 315 | 0.63 |
| 400 | 0.88 |
| 500 | 1.00 |
| 630 | 0.97 |
| 800 | 0.94 |
| 1000 | 1.04 |
| 1250 | 1.09 |
| 1600 | 1.11 |
| 2000 | 1.08 |
| 2500 | 1.09 |
| 3150 | 1.06 |
| 4000 | 1.04 |
| 5000 | 1.03 |
| 4 Freq Avg | 0.913 |
| NRC | 0.90 |

Table 3 illustrates Steiner Tunnel test results performed on the panel made in accordance with Example 1. The Steiner Tunnel, designated ASTM E-84, is a measure of flame-spread and smoke generation of a building material. In the Steiner Tunnel test, a material is inserted above a 25 foot tunnel. A controlled air velocity is established in the tunnel and the material is ignited at one end. The flame front is measured with time as it travels down the tunnel and the amount of smoke generated is measured as it exits the

TABLE 1

| Paper-backed Panel Freq (Hz) | Test 1 Threshold Loss (dB) | Deficiencies | Paper-backed Panel Freq (Hz) | Test 2 Threshold Loss (dB) | Paper-backed Panel Freq (Hz) | Test 3 Threshold Loss (dB) | Foil-backed Panel Freq (Hz) | Test 1 Threshold Loss (dB) | Deficiencies | Foil-backed Panel Freq (Hz) | Test 2 Threshold Loss (dB) | Deficiencies |
|---|---|---|---|---|---|---|---|---|---|---|---|---|
| 125 | 21.86 | 0 | 125 | 19.9 | 125 | 21.3 | 125 | 22.00 | 0 | 125 | 20.56 | 0 |
| 160 | 24.19 | 0 | 160 | 24.1 | 160 | 23.5 | 160 | 25.21 | 0 | 160 | 21.70 | 0 |
| 200 | 23.58 | 0 | 200 | 23.3 | 200 | 22.6 | 200 | 23.97 | 0 | 200 | 21.51 | 0 |
| 250 | 26.20 | 0 | 250 | 25.7 | 250 | 25 | 250 | 26.73 | 0 | 250 | 24.30 | 0 |
| 315 | 24.18 | 0 | 315 | 23.7 | 315 | 24.1 | 315 | 23.05 | 1 | 315 | 22.09 | 3 |
| 400 | 24.23 | 3 | 400 | 27.2 | 400 | 26 | 400 | 19.17 | 8 | 400 | 23.57 | 4 |
| 500 | 23.34 | 5 | 500 | 29.2 | 500 | 26.1 | 500 | 21.67 | 6 | 500 | 25.35 | 4 |
| 630 | 21.03 | 8 | 630 | 23.2 | 630 | 21.7 | 630 | 28.51 | 0 | 630 | 23.25 | 7 |
| 800 | 23.62 | 6 | 800 | 22.8 | 800 | 24.4 | 800 | 31.57 | 0 | 800 | 26.08 | 5 |
| 1000 | 31.77 | 0 | 1000 | 30.4 | 1000 | 33.8 | 1000 | 30.37 | 1 | 1000 | 35.26 | 0 |
| 1250 | 30.69 | 1 | 1250 | 34.7 | 1250 | 31.7 | 1250 | 31.40 | 1 | 1250 | 32.77 | 0 |
| 1600 | 29.95 | 2 | 1600 | 30.8 | 1600 | 30.4 | 1600 | 31.87 | 0 | 1600 | 30.64 | 2 |
| 2000 | 31.19 | 1 | 2000 | 33.3 | 2000 | 31.2 | 2000 | 34.80 | 0 | 2000 | 31.07 | 2 |
| 2500 | 34.73 | 0 | 2500 | 33.8 | 2500 | 33.4 | 2500 | 36.63 | 0 | 2500 | 35.68 | 0 |
| 3150 | 37.74 | 0 | 3150 | 39.5 | 3150 | 36.3 | 3150 | 40.02 | 0 | 3150 | 40.21 | 0 |
| 4000 | 41.45 | 0 | 4000 | 43 | 4000 | 39.3 | 4000 | 43.01 | 0 | 4000 | 43.46 | 0 |
| | CAC-28 Def 26 | | | CAC-29 Def 21 | | CAC-29 Def 21 | | CAC 28 Def 17 | | | CAC 28 Def 28 | |

Table 2 illustrates the noise reduction coefficient (NRC) test results for the same lot of material tested for CAC in Example 1. These results demonstrate the ability of the paper-backed composite to absorb a high level of sound from within the room in which it is installed.

tunnel. Flame-spread and smoke values are calculated from the data. A flame-spread value of 25 or under and a smoke value of 50 or under "Class A" rating is required for the majority of ceiling panels and that is the goal for this invention.

TABLE 3

| Material Slit or not | Glue Type | Glue Application | Flamespread Value | Smoke Value |
|---|---|---|---|---|
| No | FA2AB | 3.8 g/ft² | 25 | 15 |
| No | Fuller | 4.1 g/ft² | 35 fail | 10 |
| No | FA2AB | 3.75 g/ft² | 23 | 13 |
| No | FA2AB | 4.5 g/ft² | 15 | 7 |
| No | FA2AB | 5.2 g/ft² | 13 | 3 |
| No | FA2AB | 5.5 g/ft² | 5.04 | 7.06 |
| Yes | FA2AB | 5.5 g/ft² | 10.08 | 8.1 |
| Yes | FA2AB | 5.5 g/ft² | 10.05 | 5.95 |

Our experimental results indicate that the calendered, flame-retardant paper in our invention performs equal to aluminum foil in the reduction of sound transmission, and serves to alleviate the problems and expense of using a metallic foil.

The process of making the inventive tile includes the first step of laminating in a continuous fashion the paper backing to the fiberglass core. In Example 1, the inventors utilized prefabricated 4 ft by 8 ft fiberglass cores transported by a conveyor down a production line. It will be apparent to the ordinarily skilled artisan that one may use a core of virtually any size. As the bats progress down the production line, an application roller receives the adhesive and applies the adhesive in a continuous, roll-coating fashion onto the bats.

A roll of paper disposed above the production line feeds the paper backing to the glue-laden cores in a continuous manner. Next, a mating roll passes over the core-backing subassembly. The subassembly then passes through a double-surface pressure conveyor, which further compresses the paper backing onto the core and assures a smooth, wrinkle-free application and full contact between the paper and the core.

A series of air convection blowers then apply heat to the core and backing to cure the adhesive. The core and paper subassembly then passes beneath, but not in contact with, a heated roll for further curing. Finally, the core and paper subassemblies travel through a gas-fired oven set to 200° F. for several minutes to complete the drying and curing.

A slitting operation then slits the paper to size between the core-paper subassemblies. The operation then trims the subassembly edges, and inverts and stacks each subassembly. The subassemblies then travel down the line again in a second pass, in which the production line applies a scrim face to the opposite face of the core. In this pass, the production line lowers the heating roll down to contact the scrim surface on the core. Following application of the heated roll, spayers on the production line apply the paint to the scrim. Next, a gas-fired oven dries the paint. The production process then cuts each panel to size and packages the panels.

While preferred embodiments have been illustrated and described above, it is recognized that variations may be made with respect to features and components of the invention. Therefore, while the invention has been disclosed in preferred forms only, it will be obvious to those skilled in the art that many additions, deletions and modifications can be made therein without departing from the spirit and scope of this invention, and that no undue limits should be imposed thereon except as set forth in the following claims. For example, it is contemplated that many types of materials may comprise the core of the inventive panel, as described above. Additionally, the present invention is not limited to ceiling tiles, but may include wall structures and tackable surfaces.

What is claimed is:

1. A multi-layered, substantially rigid and self-supporting acoustical panel comprising:
   a core having a first face and a second face disposed opposite the first face;
   an acoustically permeable facing layer applied to the first face;
   a calendered paper backing adapted to be applied to the core, the paper backing being substantially free of metallic material and including a flame-retardant material; and
   wherein the panel exhibits a CAC test threshold noise loss of up to approximately 22 dB at a test noise frequency of approximately 125 Hz.

2. The acoustical panel of claim 1, wherein the core is acoustically absorbent, semi-rigid, and having a substantially continuous interior porosity.

3. The acoustical panel of claim 1, wherein the facing layer is adapted to allow acoustical energy to pass through the facing layer and into the core.

4. The acoustical panel of claim 1, further including an adhesive adapted to attach the paper backing to the core.

5. The acoustical panel of claim 4, further including a flame retardant within the adhesive.

6. The acoustical panel of claim 5, wherein the flame-retardant adhesive comprises a poly (vinyl acetate) glue.

7. The acoustical panel of claim 1, further including a perimeter edge portion separating the first and second faces.

8. The acoustical panel of claim 1, further including the core being formed from a fiberglass bat, wherein the bat is bound into a semi-rigid state with a resin material.

9. The acoustical panel of claim 1, further including the core being formed from a material selected from the group consisting of a slag mineral fiber, a cellulose, a polymeric fiber, a cementitious foam, bound aggregate particles and combinations thereof.

10. The acoustical panel of claim 1, wherein the facing layer comprises an air permeable scrim material and a flame-retardant adhesive for adhering the scrim to the core.

11. The acoustical panel of claim 12, further comprising a layer of paint applied to the scrim material.

12. The acoustical panel of claim 1, wherein the facing layer comprises a perforated polymeric film for allowing permeation of acoustical energy throughout the core.

13. The acoustical panel of claim 1, wherein the facing layer further comprises a material selected from the group consisting of polyvinylchloride film, an air permeable layer of paint and combinations thereof.

14. The acoustical panel of claim 1, wherein the calendered paper has a basis weight between about 30 lb./3000 ft² to about 70 lb./3000 ft².

15. The acoustical panel of claim 1, wherein the calendered, flame-retardant paper includes a flame-retardant material constituent comprising between about 11–13% by mass of the paper.

16. A method of manufacturing a multi-layered, substantially rigid acoustical panel comprising the steps of:
   providing an acoustically absorbent core having a first face, and a second face disposed opposite the first face;
   applying a finishing layer to the first face of the core;
   adhering a calendered, flame-retardant, and substantially metallic material free cellulosic sheet to the second face of the core; and
   wherein the panel exhibits a CAC test threshold noise loss of up to approximately 22 dB at a test noise frequency of approximately 125 Hz.

17. The method of claim 16, further including applying an adhesive to the second face of the core.

18. The method of claim 17, wherein the adhesive is flame-retardant.

19. The method of claim 17, further including applying heat to the core and sheet to cure the adhesive.

20. The method of claim 17, further including applying a compressive force to the flame-retardant sheet and adhesive to insure bonding between the sheet and core.

21. A multi-layered, substantially rigid and self-supporting acoustical panel comprising:
   a core having a first face and a second face disposed opposite the first face;
   an acoustically permeable facing layer applied to the first face; and
   a calendered paper backing adapted to be applied to the core, the paper backing being substantially free of metallic material and including a flame-retardant material, and wherein the calendered paper has a density of about at least 69 lb./ft.$^3$.

22. A multi-layered, substantially rigid and self-supporting acoustical panel comprising:
   a core having a first face and a second face disposed opposite the first face;
   an acoustically permeable facing layer applied to the first face; and
   a calendered paper backing adapted to be applied to the core, the paper backing being substantially free of metallic material and including a flame-retardant material and the calendered paper having a TAPPI porosity of about at least 110 seconds.

23. A multi-layered, substantially rigid and self-supporting acoustical panel comprising:
   a core having a first face and a second face disposed opposite the first face;
   an acoustically permeable facing layer applied to the first face;
   a calendered paper backing adapted to be applied to the core, the paper backing being substantially free of metallic material and including a flame-retardant material; and
   wherein said panel exhibits a CAC test threshold noise loss of up to approximately 43 dB at a noise frequency of approximately 4000 Hz.

24. A method of manufacturing a multi-layered, substantially rigid acoustical panel comprising the steps of:
   providing an acoustically absorbent core having a first face, and a second face disposed opposite the first face;
   applying a finishing layer to the first face of the core; and
   adhering a calendered, flame-retardant, and substantially metallic material free cellulosic sheet to the second face of the core wherein said panel exhibits a CAC test threshold noise loss of up to approximately 43 dB at a noise frequency of approximately 4000 Hz.

* * * * *